(12) United States Patent
Bartow et al.

(10) Patent No.: US 9,211,941 B2
(45) Date of Patent: Dec. 15, 2015

(54) INTERLOCKING SWIM NOODLES

(71) Applicants: Douglas H. Bartow, Greenville, SC (US); Davis K. Bartow, Greenville, SC (US)

(72) Inventors: Douglas H. Bartow, Greenville, SC (US); Davis K. Bartow, Greenville, SC (US)

(*) Notice: Subject to any disclaimer, the term of this patent is extended or adjusted under 35 U.S.C. 154(b) by 0 days.

(21) Appl. No.: 13/935,928

(22) Filed: Jul. 5, 2013

(65) Prior Publication Data
US 2013/0294823 A1    Nov. 7, 2013

Related U.S. Application Data

(63) Continuation-in-part of application No. 13/368,405, filed on Feb. 8, 2012.

(60) Provisional application No. 61/750,398, filed on Jan. 9, 2013.

(51) Int. Cl.
| | |
|---|---|
| *B63C 9/08* | (2006.01) |
| *B63B 35/85* | (2006.01) |
| *A63B 31/00* | (2006.01) |
| *A63H 33/06* | (2006.01) |
| *A63H 23/10* | (2006.01) |
| *F16B 7/18* | (2006.01) |
| *A63B 9/00* | (2006.01) |

(52) U.S. Cl.
CPC ............... *B63B 35/85* (2013.01); *A63B 31/00* (2013.01); *A63H 23/10* (2013.01); *A63H 33/062* (2013.01); *A63B 2009/006* (2013.01); *F16B 7/18* (2013.01); *F16B 7/182* (2013.01); *Y10T 29/49963* (2015.01); *Y10T 403/68* (2015.01)

(58) Field of Classification Search
USPC ............................................. 441/129
IPC ............................................. B63B 35/74
See application file for complete search history.

(56) References Cited

U.S. PATENT DOCUMENTS

| | | | |
|---|---|---|---|
| 3,274,624 A | | 9/1966 | Noerdinger |
| 3,992,739 A | | 11/1976 | Stevens et al. |
| 4,472,225 A | | 9/1984 | Bimpson |
| 4,768,456 A | | 9/1988 | Jones et al. |
| 5,238,231 A | * | 8/1993 | Huang .................. 267/35 |
| 5,685,752 A | | 11/1997 | Fulton, Jr. |
| 5,779,512 A | | 7/1998 | Rupert |
| 6,027,393 A | | 2/2000 | O'Rourke |
| 6,056,613 A | | 5/2000 | Pike |
| 6,106,349 A | | 8/2000 | Motosko |
| 6,132,276 A | | 10/2000 | Leemon |
| 6,182,580 B1 | | 2/2001 | Barrett et al. |
| 6,494,339 B1 | | 12/2002 | Engelhard et al. |
| 6,497,919 B1 | | 12/2002 | Hartman |
| 6,554,677 B2 | | 4/2003 | Leemon |
| 6,615,762 B1 | | 9/2003 | Scott |
| 6,790,112 B2 | | 9/2004 | Kirk |
| D618,968 S | * | 7/2010 | Belden ...................... D7/620 |

(Continued)

*Primary Examiner* — Stephen Avila
(74) *Attorney, Agent, or Firm* — Smith Moore Leatherwood LLP; Thomas W. Epting; Matthew S. Bedsole

(57) ABSTRACT

A device for connection to at least one swim noodle having an alcove defined by side walls. The device includes a body member having an elongated base portion and a generally conical shaped engagement portion connected to and extending generally perpendicularly outwardly from the base portion. A barb extends generally helically about the engagement portion for substantially the length of the engagement portion, and the base defining at least one coupling profile.

19 Claims, 25 Drawing Sheets

(56) References Cited

U.S. PATENT DOCUMENTS

| | | |
|---|---|---|
| 2008/0226859 A1 | 9/2008 | Manning et al. |
| 2009/0087255 A1* | 4/2009 | Jorna .......................... 403/171 |
| 2012/0068028 A1* | 3/2012 | Arnold et al. .............. 248/205.2 |
| 2012/0269570 A1* | 10/2012 | Felber .......................... 403/205 |
| 2013/0244530 A1* | 9/2013 | Renfro .......................... 446/124 |

* cited by examiner

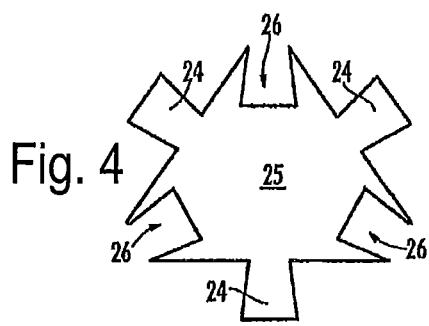
Fig. 4
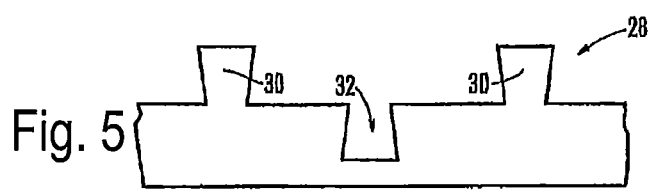
Fig. 5
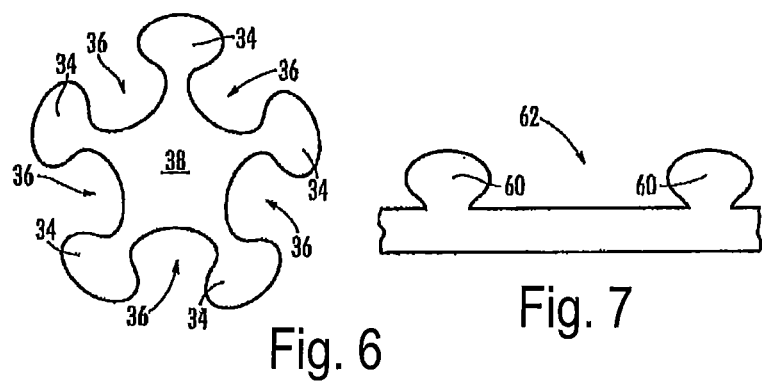
Fig. 6
Fig. 7

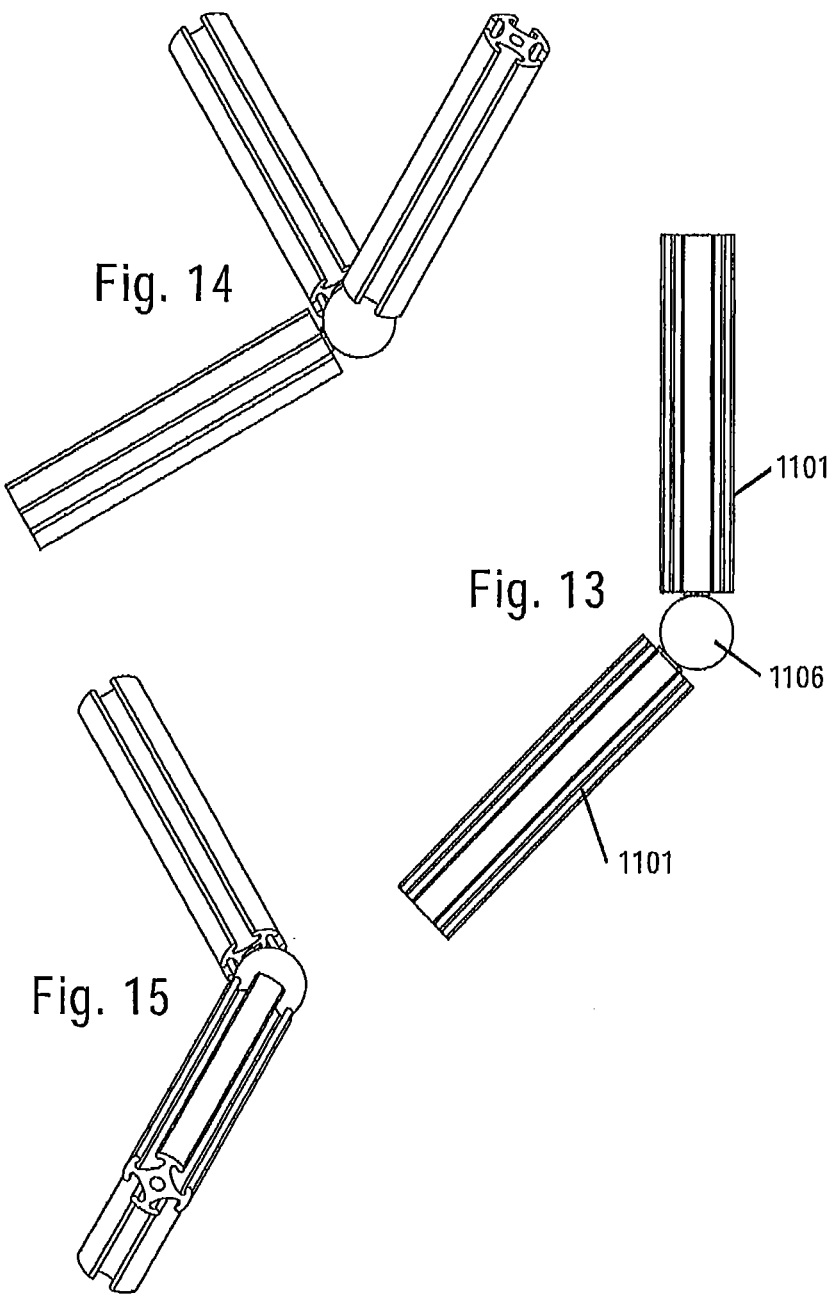

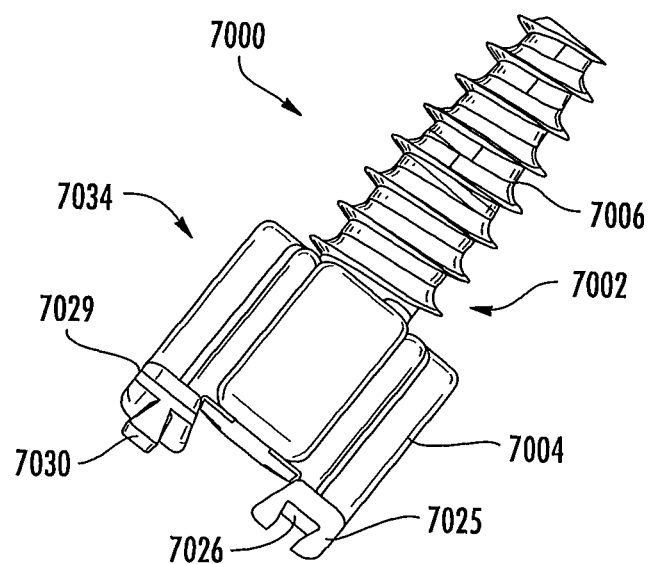
Fig. 32A
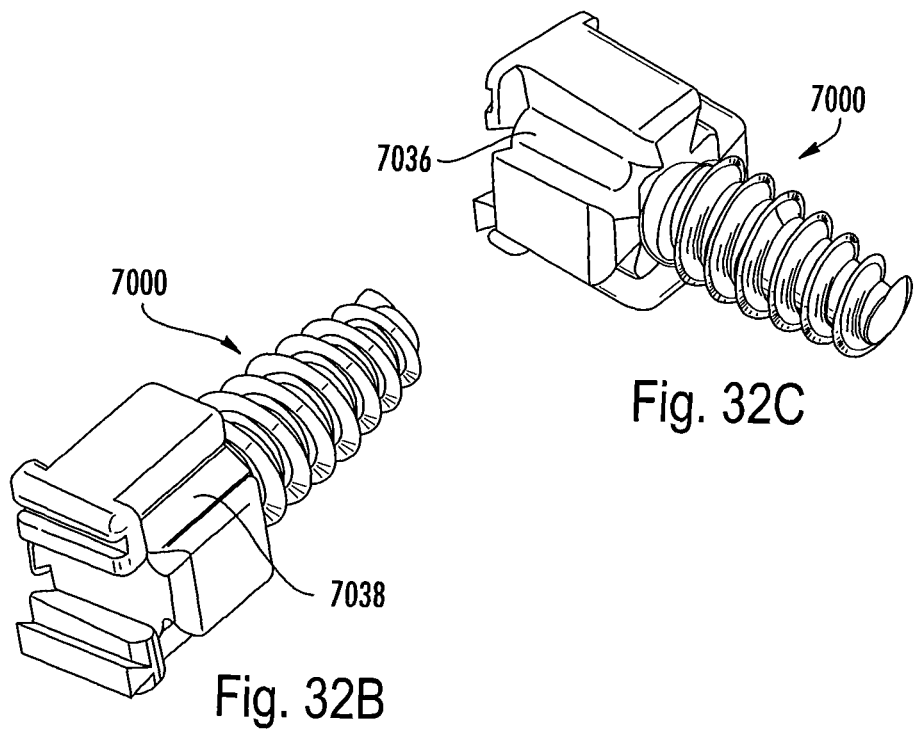
Fig. 32C
Fig. 32B

INTERLOCKING SWIM NOODLES

CROSS-REFERENCE TO RELATED APPLICATIONS

The present application is a continuation-in-part of U.S. patent application Ser. No. 13/368,405, filed Feb. 8, 2012, now U.S. Pat. No. 8,920,206 issued Dec. 30, 2014, and claims benefit and priority to PCT Application No. PCT/US13/25301, having an international filing date of Feb. 8, 2013, and U.S. Provisional Patent Application No. 61/750,398 filed Jan. 9, 2013, the entirety of the foregoing applications being incorporated herein by reference.

BACKGROUND

The present invention is related to interlocking swim noodles which greatly increases the utility of extruded closed cell noodles for water play. More specifically, the present invention is related to interlocking swim noodles with interlocking structures and connectors which allow the noodles to be arranged in a variety of configurations for increased enjoyment.

Extruded closed cell noodles have been available for water play for many years and they are now a widely recognized toy in swimming areas. They are typically cylindrical, or polygonal, and used merely as an entertainment flotation device. More recently cylindrical couplers, like sleeves, have been provided which allow the noodles to be coupled lengthwise for increased configurations. There has been no suitable method for coupling noodles in perpendicular or parallel side-by-side arrangement which has limited the activities the noodles can be used for.

SUMMARY

It is an object of the invention to provide interlocking swim noodles.

An advantage of the present invention is the large number of configurations available with limited components.

These and other advantages, as will be realized, are provided in an interlocking swim noodle system. The system has a first interlocking swim noodle with a central core and at least one node, diverging outwardly from the central core, and at least one alcove, converging outwardly from the central core, wherein the node and alcove are arranged to mate by resistance fit with a second interlocking swim noodle or connector.

Yet another advantage is provided in an interlocking swim noodle system. The system has a first interlocking swim noodle with a first central core. At least one first node extends from the central core and diverges outwardly. At least one first alcove converges outwardly from the central core. The system also has a second interlocking swim noodle with a second central core. At least one second node extends from the central core and diverges outwardly from the second central core. At least one second alcove converges outwardly from the second central core wherein the second node is arranged to mate by resistance fit with the first alcove or with a connector.

Yet another embodiment is provided in an interlocking swim noodle system. The system has a first interlocking swim noodle with a central core at least one node diverging outwardly from the central core and at least one alcove converging outwardly from the central core wherein the node and the alcove are arranged to mate with at least one of a second interlocking swim noodle or a connector.

Another embodiment is provided which includes a device for connection to a swim noodle having an alcove defined by side walls. The device comprises a body member having an elongated base portion. A generally conical shaped engagement portion is connected to and extends generally perpendicularly outwardly from the base portion, and a barb extends generally helically about the engagement portion for substantially the length of the engagement portion. Also, the base defines at least one coupling profile.

Another embodiment includes a device for connection to a swim noodle having an alcove defined by side walls. The device includes a body member having an elongated base portion and a generally conical shaped engagement portion connected to and extending generally perpendicularly outwardly from the base portion. The engagement portion defines a generally helically threaded portion extending substantially the length of the engagement portion. The base portion defining a flange configured to be received in the alcove and to engage with the sidewalls of the alcove upon the base portion being twisted to secure the body member to the swim noodle.

Still another embodiment includes an apparatus for connection to a swim noodle. Such device comprises a first body member and a second body member, each including: an elongated base portion; a generally conical shaped engagement portion connected to and extending generally perpendicularly outwardly from the base portion; the engagement portion defining a generally helically threaded portion extending substantially the length of the engagement portion; and a cooperating coupling configuration provided on the base portion. The cooperating coupling configuration of the first body member is adapted to releasably mate with the cooperating coupling configuration of the second body member to secure the first body member to the second body member.

A still further embodiment includes a method of joining first and second swim noodles together. The method includes: providing a first connector and a second connector, each having a generally conical shaped engagement portion defining a generally helically threaded portion and a cooperating coupling configuration; mating the cooperating coupling configuration of the first connector and the second connector together to secure the first body member to the second body member; using a generally rectilinear force to push the engagement portion of the first connector into the first swim noodle; and using a generally rectilinear force to push the engagement portion of the second connector into the second swim noodle.

BRIEF DESCRIPTION OF DRAWINGS

FIG. 4 is a schematic end view of an embodiment of the invention.

FIG. 5 is a schematic end view of an embodiment of the invention.

FIG. 6 is a schematic end view of an embodiment of the invention.

FIG. 7 is a schematic end view of an embodiment of the invention.

FIG. 13 is a schematic perspective view of an embodiment of the invention.

FIG. 14 is a schematic perspective view of an embodiment of the invention.

FIG. 15 is a schematic perspective view of an embodiment of the invention.

FIG. 32A is a schematic perspective view of an embodiment of the invention.

FIG. 32B is a schematic perspective view of an embodiment of the invention.

FIG. 32C is a schematic perspective view of an embodiment of the invention.

DESCRIPTION

The present invention is specific to interlocking swim noodles. More specifically, the present invention is related to swim noodles with alcoves and node components parallel to the long axis of the swim noodle wherein the alcoves and node components can be interlocked to form closed cell foam structure for water play or they can engage with connectors. Even more specifically, cross-brace components and connectors are provided which interlink to interlocking swim noodles thereby allowing for the formation of closed cell foam structures for water play.

The invention will be described with reference to the figures which form an integral part of the invention. Throughout the specification similar elements will be numbered accordingly.

Figure 1:
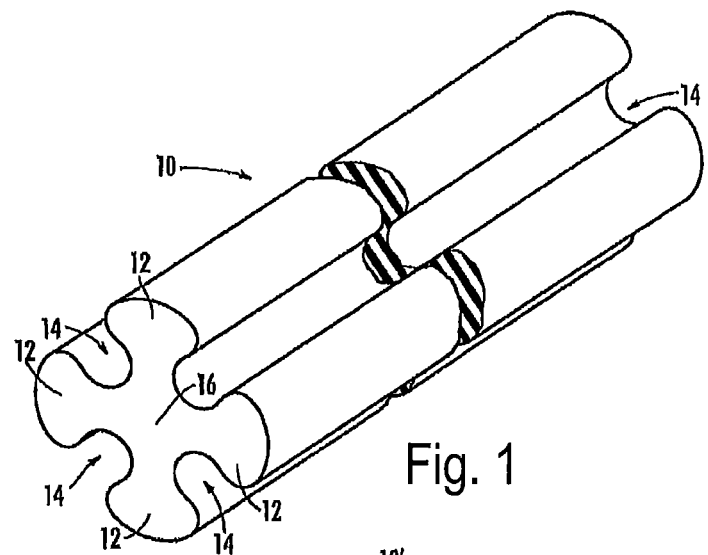
FIG. 1 is a schematic perspective view of an embodiment of the invention.

An embodiment of the invention is illustrated in FIG. 1. In FIG. 1, an interlocking swim noodle, 10, is illustrated in schematic perspective view. The interlocking swim noodle comprises nodes, 12 and alcoves, 14, arranged around a central core, 16. The nodes extend from the core and diverge outwardly from the core and the alcoves converge outwardly from the core such that in one embodiment when a node is inserted into an alcove an interference fit is achieved. In one embodiment the nodes and alcoves are arcuate, preferably with a variable arc, and in one embodiment the nodes and alcoves are a portion of an obround. It would be apparent that the nodes and alcoves are sufficiently pliable to be distortable to the degree necessary to interlock, and be separated, yet return towards relaxed state to form an interlocking interference fit when joined.

Figure 2:
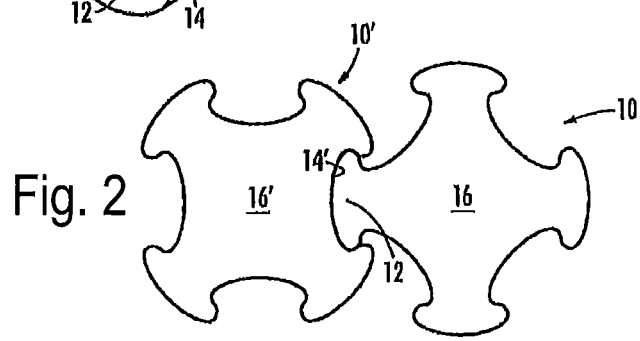
FIG. 2 is a schematic end view of an embodiment of the invention.

An embodiment of the invention is illustrated in schematic end view in FIG. 2 wherein two interlocking swim noodles are engaged with a node, 12, of one interlocking swim noodle, 10, engaged with an alcove, 14', of a second interlocking swim noodle, 10', thereby securing the first core, 16, and second core, 16', in relatively fixed side-by-side and parallel position. While illustrated with only two interlocking swim noodles engaged any number of interlocking noodles can be engaged to form various configurations including being arranged in a common plane, wherein interlocking swim noodles are interlocked on opposite sides of at least one interlocking swim noodle there between, or at angles, wherein interlocking swim noodles are interlocked with at least one interlocking swim noodle there between at an acute, right or obtuse angle.

Figure 3:
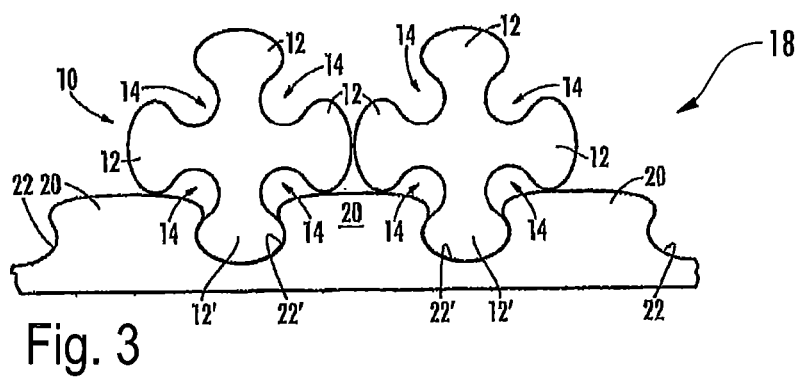
FIG. 3 is a schematic end view of an embodiment of the invention.

An embodiment of the invention is illustrated in schematic side view in FIG. 3. In FIG. 3, an interlocking swim noodle, 10, with nodes, 12, and alcoves, 14, is interlocked with a cross-brace, 18, comprising cross-brace alcoves, 22, and islands, 20. In one embodiment the islands have a width, measured between alcoves, such that adjacent interlocking swim noodles will be in close proximity and preferably in physical contact. As illustrated the node, 12', is inserted into crossbrace alcove, 22'.

An embodiment of the invention is illustrated in schematic end view in FIG. 4. In FIG. 4, the nodes, 24, and alcoves, 26, are trapezoidally shaped thereby allowing for an interference fit when a node of one interlocking swim noodle is inserted into an alcove of the same or an adjacent interlocking swim noodle. The alcoves and nodes are arranged around a central core, 25.

An embodiment of the invention is illustrated in schematic end view in FIG. 5. In FIG. 5 a cross-brace, 28, comprising trapezoidally shaped nodes, 30, and alcoves, 32, is provided which allows for the parallel arrangement of interlocking swim noodles in a manner analogous to the embodiment illustrated in FIG. 3.

Figure 8:
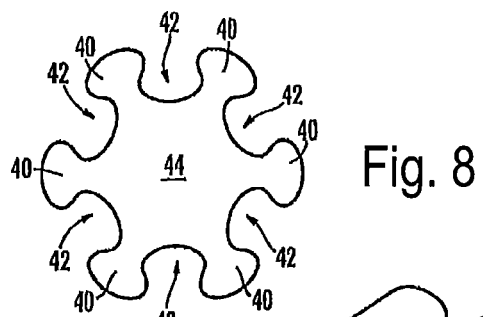
FIG. 8 is a schematic end view of and embodiment of the invention.

Embodiments of the invention are illustrated in end view in FIGS. 6 and 8. FIG. 6 illustrates an interlocking swim noodle with five (5) nodes, 34, and five (5) alcoves, 36, around a central core, 38. FIG. 8 illustrates an interlocking swim noodle with six (6) nodes, 40, and six (6) alcoves, 42, around a central core, 44.

An embodiment of the invention is illustrated in schematic side view in FIG. 7. In FIG. 7 a cross-brace, 62, is illustrated with at least one node, 62, thereon for inserting in an alcove of an interlocking swim noodle.

Figure 9:
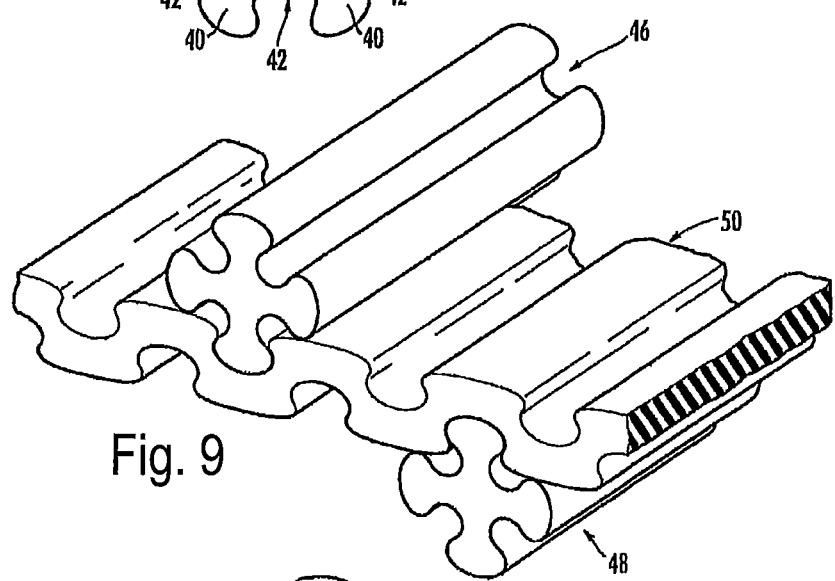
FIG. 9 is a schematic perspective view of an embodiment of the invention.

An embodiment of the invention is illustrated in schematic perspective view in FIG. 9. In FIG. 9, a first interlocking swim noodle, 46, and a second interlocking swim noodle, 48, are interlocked with a cross-brace, 50, wherein nodes of each interlocking swim noodle is inserted into an alcove of the cross-brace. The cross-brace comprises nodes on opposing faces thereby allowing multiple interlocking swim noodles to be arranged on a common face or on opposing faces of the cross-brace. One of skill in the art would immediately realize the large number of available configurations and arrangements provided by the combination of cross-braces and interlocking swim noodles.

Figure 10:
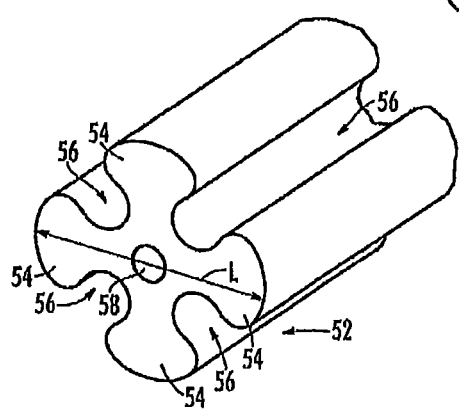
FIG. 10 is a schematic perspective view of an embodiment of the invention.

An embodiment of the invention is illustrated in schematic perspective view in FIG. 10. In FIG. 10, the interlocking swim noodle, 52, comprises mating nodes, 54, and alcoves, 56, around a central core, 58. The core has a void located therein and, preferably, extending the length of the interlocking swim noodle. In one embodiment the void increases yieldability of the nodes and alcoves to facilitate insertion of the node into the alcove. In another embodiment the void minimizes material use for economic efficiency. In yet another embodiment the void allows for additional functionality as will be realized from the description herein.

Figure 11:
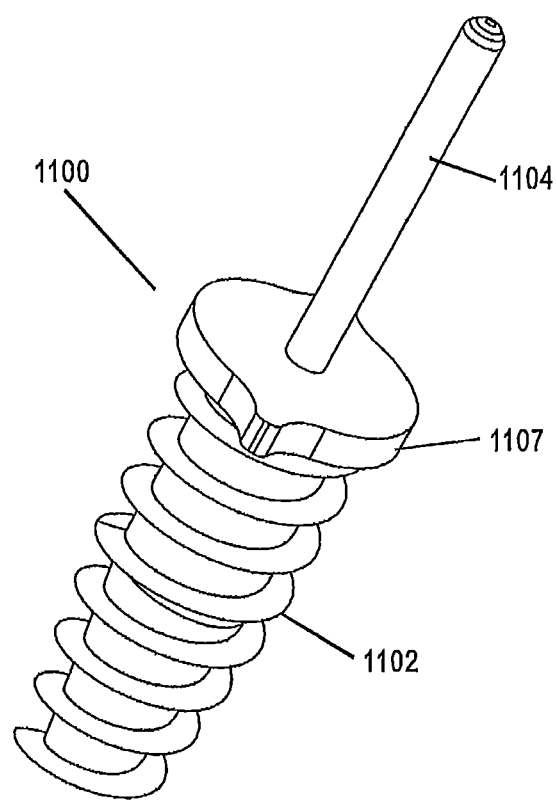
FIG. 11 is a schematic perspective view of an embodiment of the invention.
Figure 12:
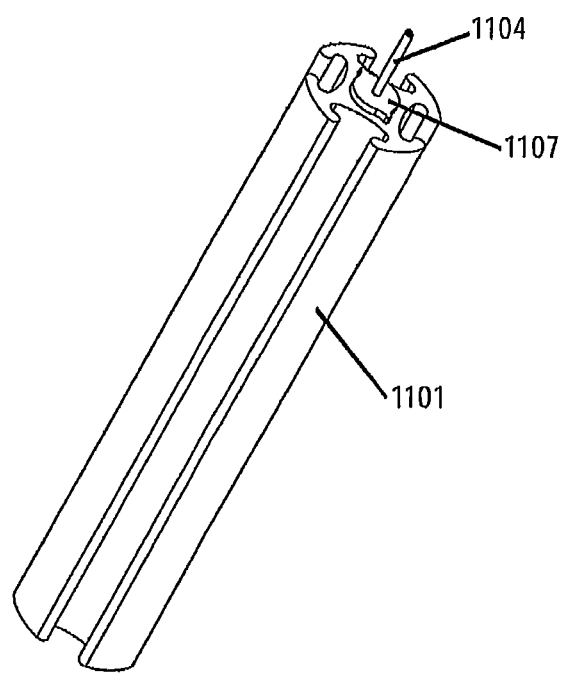
FIG. 12 is a schematic perspective view of an embodiment of the invention.

An embodiment of a connector for interlocking swim noodles is illustrated in perspective isolated view in FIG. 11 and schematic perspective view as used with an interlocking swim noodle in FIG. 12. An insert, 1100, comprising a tube engagement portion, 1102, is engaged with the interlocking swim noodle, 1101. The tube engagement portion is preferably conical shaped and more preferably barbed or threaded to provide a friction fit within the void of the central core of the interlocking swim noodle. Opposite the tube engagement portion on the insert is a joint member engagement portion, 1104, which is received by a joint member, 1106, as more readily visualized in FIG. 13. In one embodiment the insert has a centrally located collar, 1107, which restricts how far the insert can be inserted into either the interlocking swim noodle or the joint member. The joint may be pierced by the joint member engagement portion thereby forming a void which may be permanent or may at least partially close by material migration.

Multiple interlocking swim noodles, each with at least one connector, may be connected to a common joint member thereby allowing many configurations of joined interlocking swim noodles. FIGS. 14 and 15, for example, illustrate an orientation wherein multiple interlocking swim noodles are at an angle which can be acute, obtuse, a right angle or parallel. Each interlocking swim noodle may be separately engaged with an additional interlocking swim noodle in any manner otherwise described herein.

Figure 16:
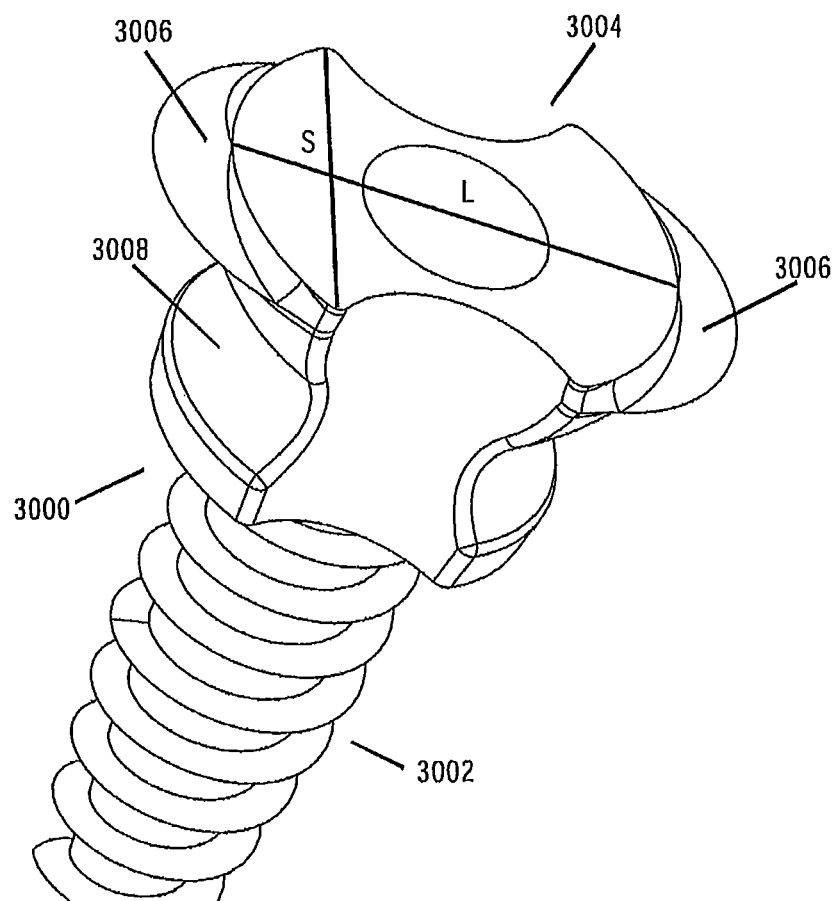
FIG. 16 is a schematic perspective view of an embodiment of the invention.

A particularly preferred connector is a T-connector with an exemplary T-connector provided in FIG. 16. The connector, generally represented at 3000, comprises a tube engagement portion, 3002, which may be barbed or threaded with threaded being preferred. The tube engagement portion is preferably sized to be received by a void of the central core as described herein. The connector is rotated such that the threads draw an alcove insert, 3004, towards the interlocking swim noodle as will be more readily appreciated from further description. The alcove insert, which is preferably integral to the connector, is preferably asymmetrically shaped with a shorter cross-section, S, which is preferably no wider than the opening of the alcove, and a long cross-section, L, which is preferably sufficiently long to lock within the alcove when the long cross-section is perpendicular to the axis of the interlocking swim noodle. To join the interlocking swim noodles the tube engagement portion can be inserted into the void of one interlocking swim noodle and the alcove insert can be oriented such that the long cross-section is parallel to the axis of the interlocking swim noodle and then rotated relative thereto such that the alcove insert wedges into the alcove. Optional, but preferred threads, 3006, can breach the surface of the alcove to provide additional strength. The alcove insert may comprise a channel, 3008, which receives the node.

Figure 17:
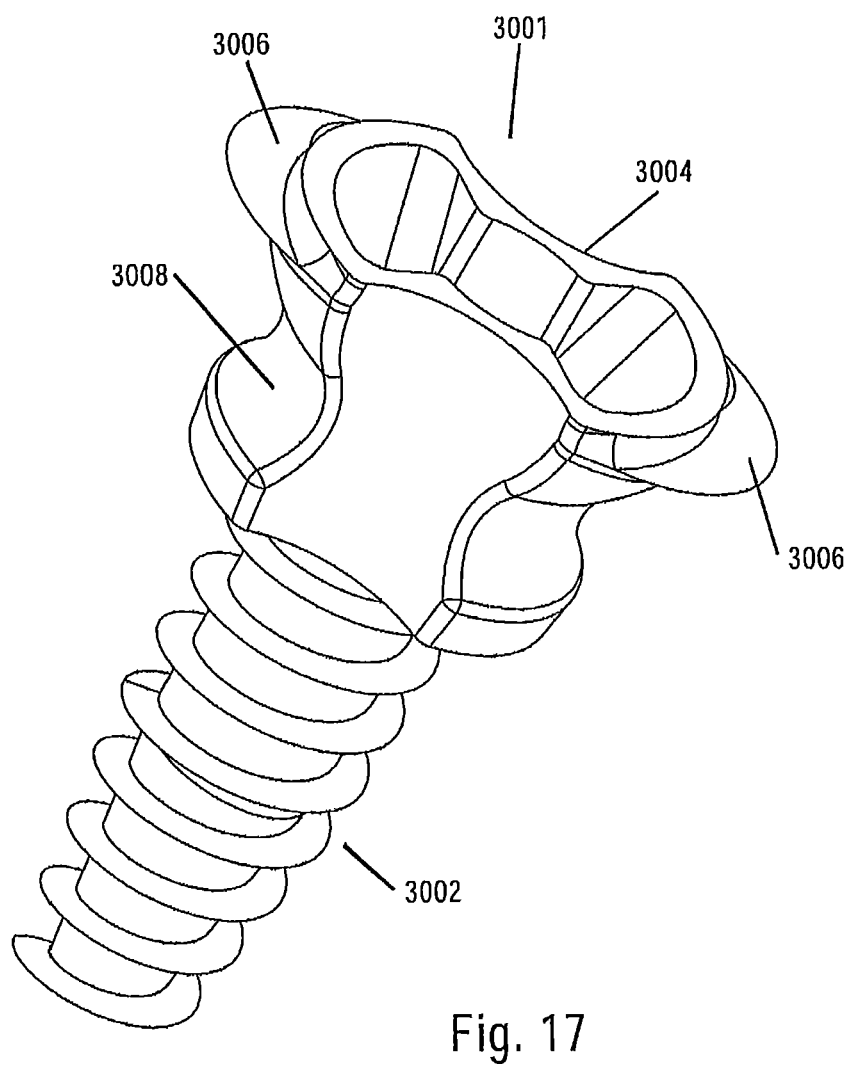
FIG. 17 is a schematic perspective view of an embodiment of the invention.

A connector which is at least partially hollow is illustrated in FIG. 17.

Figure 18:
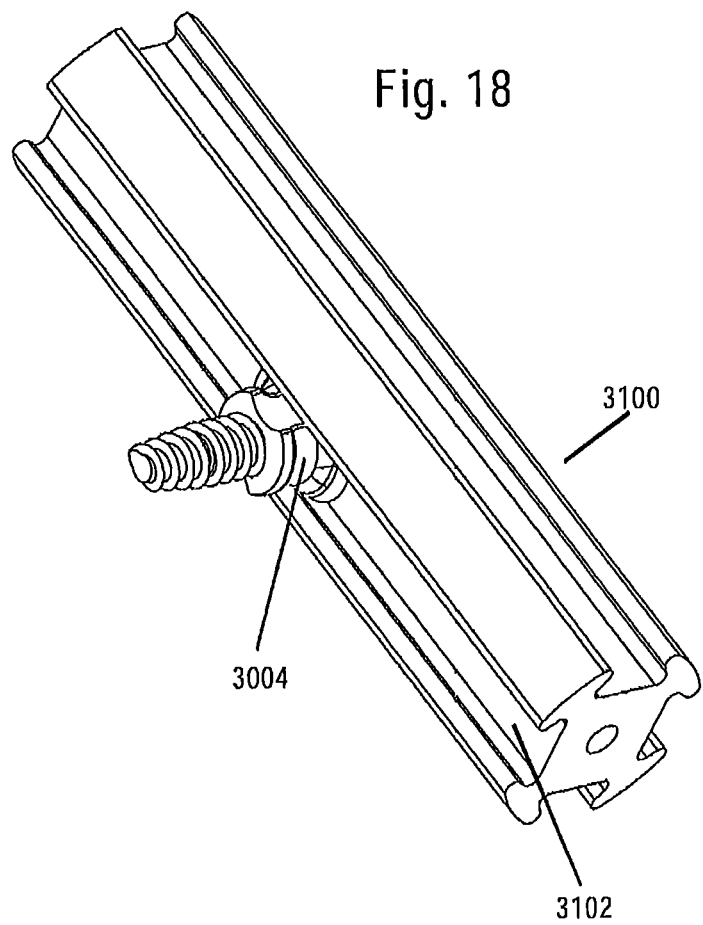
FIG. 18 is a schematic perspective view of an embodiment of the invention.

An interlocking swim noodle, 3100, is illustrated in FIG. 18 with the alcove insert engaged with the alcove, 3102.

Figure 19:
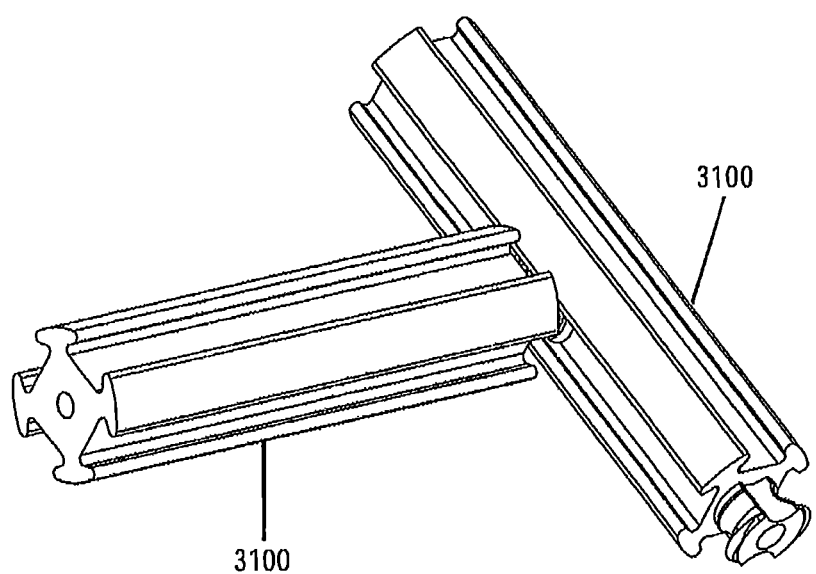
FIG. 19 is a schematic perspective view of an embodiment of the invention.

The interlocking swim noodle, 3100, of FIG. 18 is illustrated in FIG. 19 wherein the tube engagement portion is engaged with the void of a second interlocking swim noodle, 3100', and is therefore obscured from view. The tube engagement portion of a second connector is engaged with the void of interlocking swim noodle, 3100. One of skill in the art would immediately appreciate the large number of configurations available by the creative combination of connectors and interlocking swim noodles.

Figure 20:
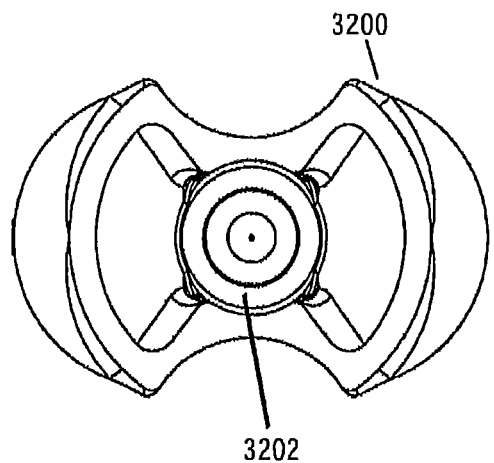
FIG. 20 is a schematic perspective view of an embodiment of the invention.
Figure 21:
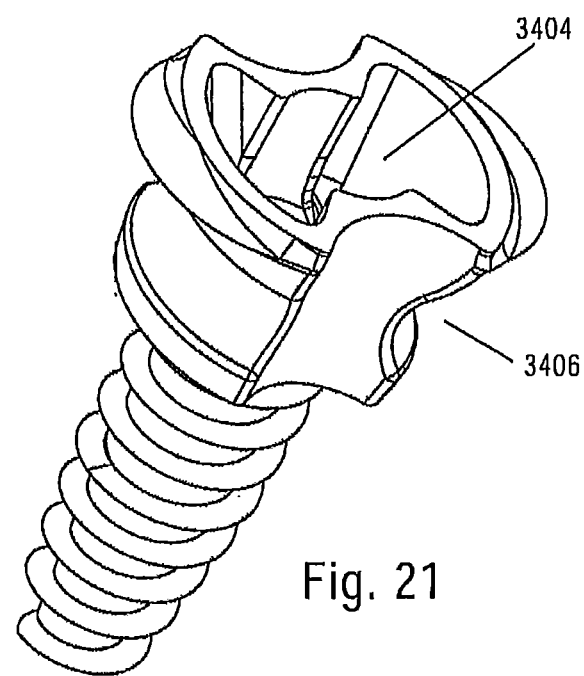
FIG. 21 is a schematic perspective view of an embodiment of the invention.
Figure 22:
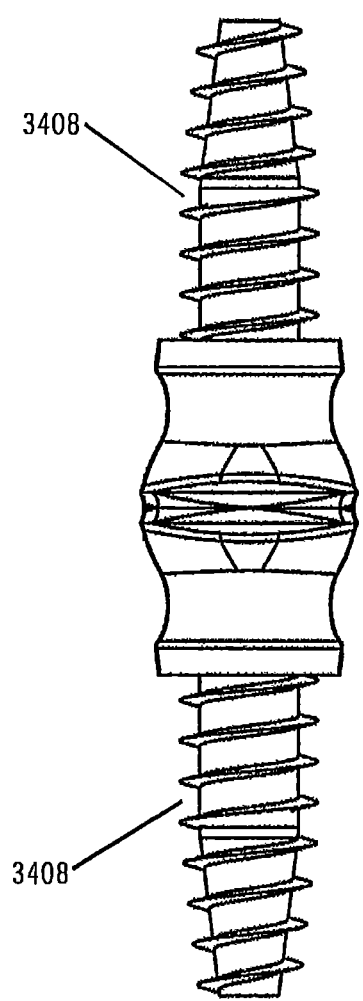
FIG. 22 is a schematic perspective view of an embodiment of the invention.
Figure 23:
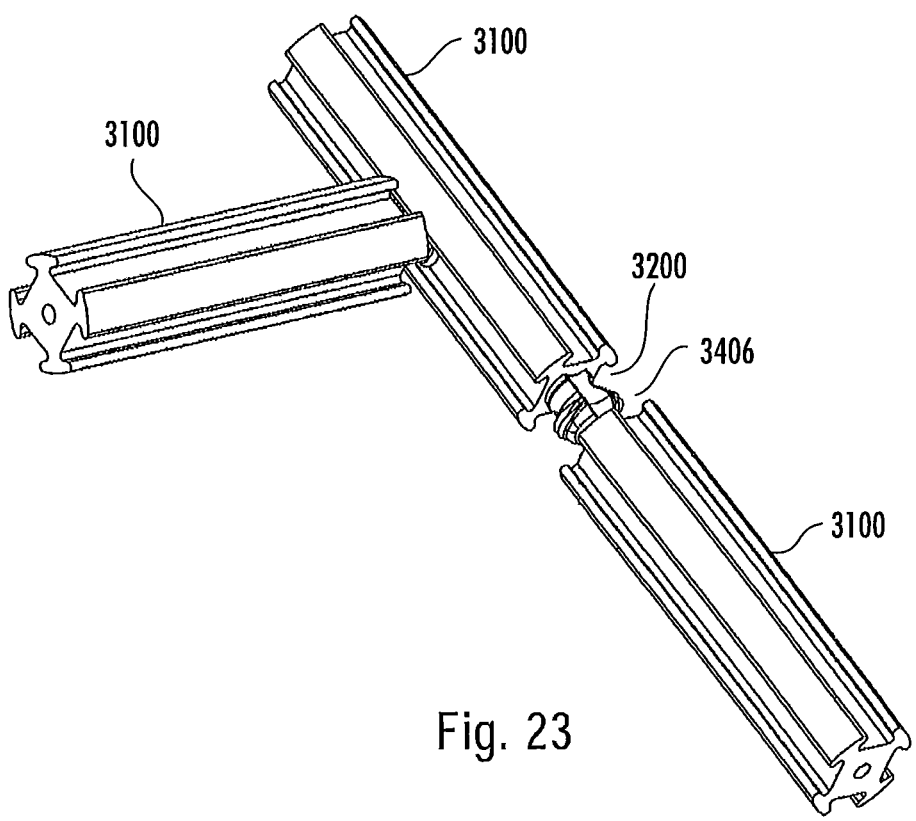
FIG. 23 is a schematic perspective view of an embodiment of the invention.

An embodiment of the connector is illustrated in FIGS. 20 and 21 wherein a first connector, 3200, comprises a cooperating coupling configuration such as a locking mechanism, 3202, which is received by a locking component, 3404, of a second connector, 3406. This allows two connectors to be connected with the tube engagement portions, 3008, opposite to each other such that two interlocking swim noodles can be connected in an end to end configuration thereby allowing for networks of interlocking swim noodles to be formed as illustrated in isolated view in FIG. 22 and as assembled in FIG. 23.

Figure 24:
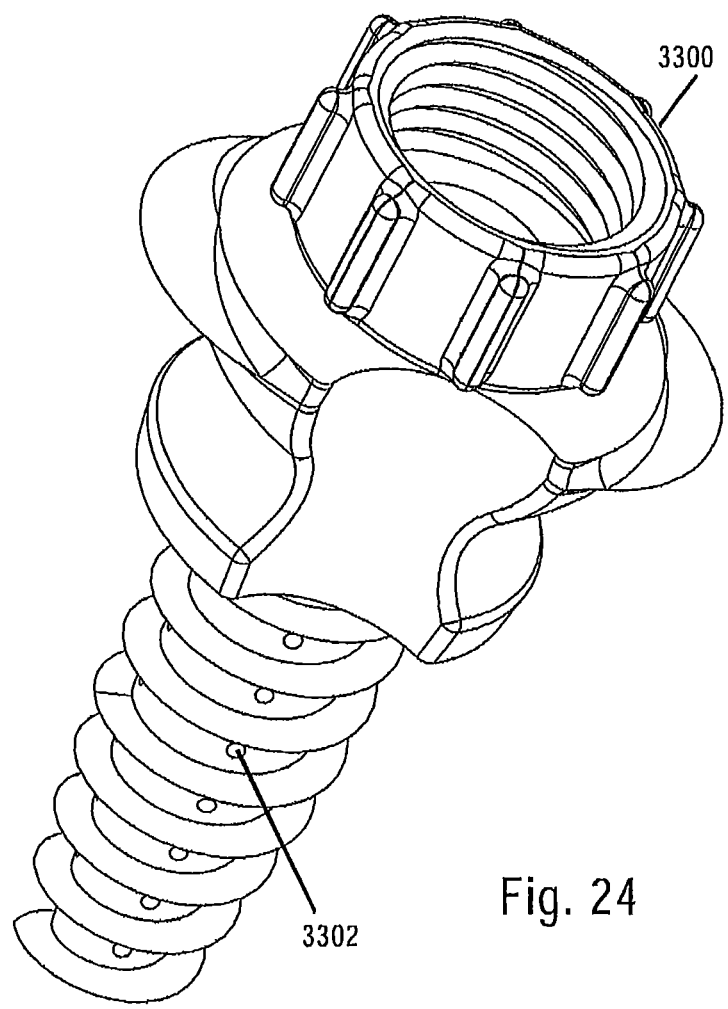
FIG. 24 is a schematic perspective view of an embodiment of the invention.

An embodiment of the invention is illustrated in FIG. 24 wherein a connector is fitted with a hose adaptor, 3300, thereby allowing water to flow through passages, 3302, wherein water can pass through the void thereby forming a water cannon for additional water activities.

Figure 25:
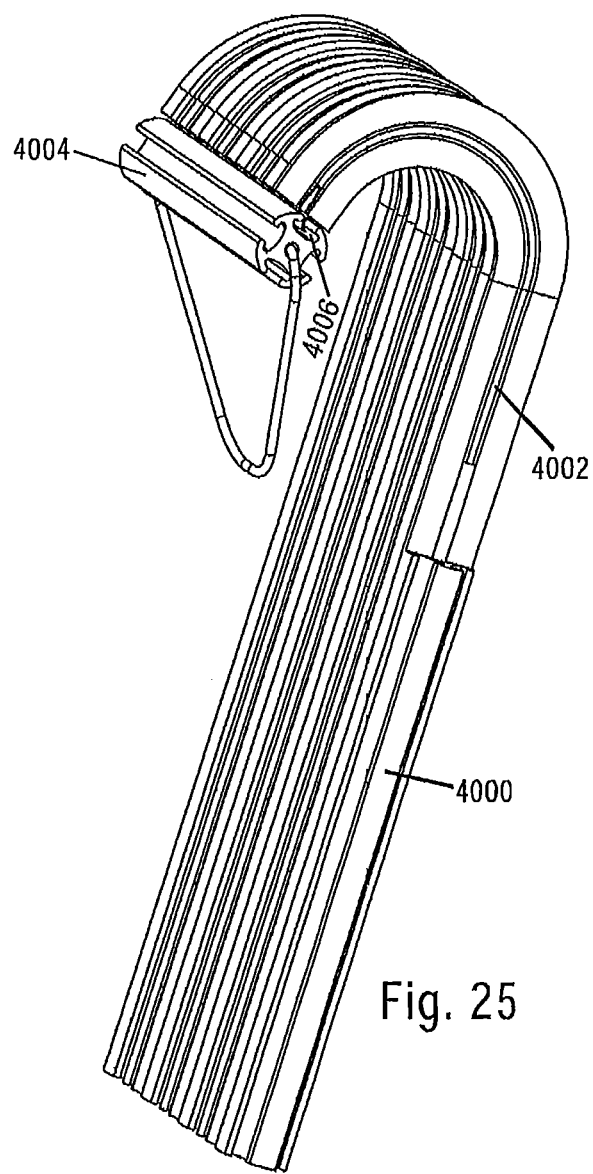
FIG. 25 is a schematic top view of an embodiment of the invention.

An embodiment of the invention is illustrated in FIG. 25 wherein multiple interlocking swim noodles are interlocked in parallel fashion for the purposes of illustration. A linear reinforcement, 4002, is inserted at least partially into the void for bending resistance or for shape retention. An optional, but preferred connector, 4006, either attached to or integral to the linear reinforcement allows other interlocking swim noodles, 4004, or additional functionality to be included.

Another embodiment of an insert, or connector, for interlocking swim noodles is illustrated in FIGS. 26 and 28-31B. Connector, generally 5000, includes a body member 5002 having an elongated base portion 5004 and a generally conical shaped engagement portion 5006 connected to and extending generally perpendicularly outwardly from the base portion 5004. The engagement portion 5006 can be of a variety of sizes, but in one exemplary implementation, the base diameter of the engagement portion 5006 is at least about 0.4 to 0.7 inches (as measured adjacent the base portion 5004)

and at least about 2 to 3 inches in length (as measure from the base portion 5004). The engagement portion 5006 defines at least one generally helically barb, or thread, 5008 extending substantially the length of the engagement portion 5006. The thread 5008 is configured to pierce and penetrate into a swim noodle.

Figure 31A:
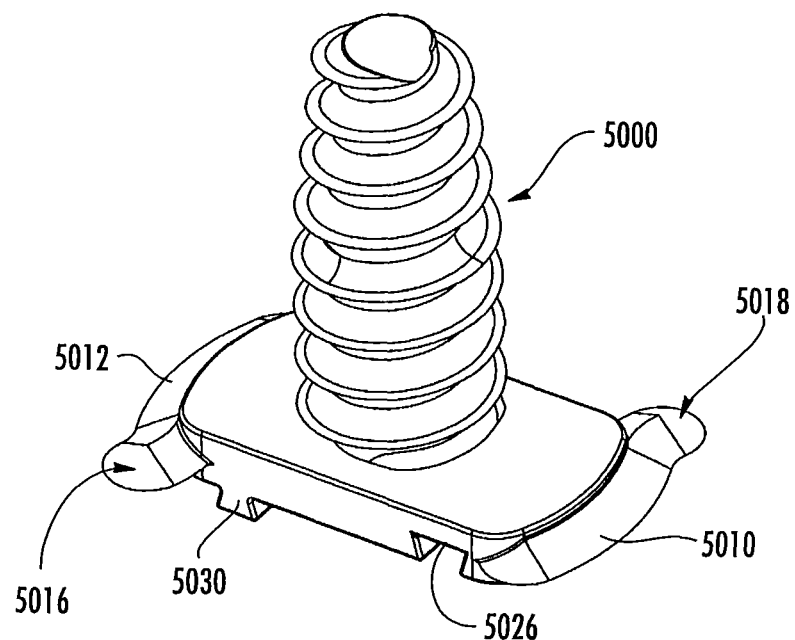
FIG. 31A is a schematic perspective view of an embodiment of the invention.

The base portion 5004 defines thread portions, or flanges, 5010, 5012 which are configured to be inserted into an alcove 3102 upon the front 5014 and back 5016 of the base portion 5004 being positioned generally parallel to the side walls 5020, 5022 (FIG. 29) of an alcove. Connector 5000 can then be twisted about the longitudinal axis of engagement portion 5006 such that flanges 5010, 5012 bite into and pierce surfaces of the alcove sidewalls to secure base portion 5004 within the alcove and, accordingly, the connector 5000 to the swim noodle. As shown in FIG. 31A, base portion 5004 includes toe portions 5018, 5019 which extend outwardly from flanges 5018, 5019, respectively, and serve to engage in the sidewalls of the swim noodle upon flanges 5010, 5012 being in sufficient engagement with the sidewalls to act as a stop to reduce the likelihood of over twisting or over tightening of connector 5000 within the alcove.

Figure 28:
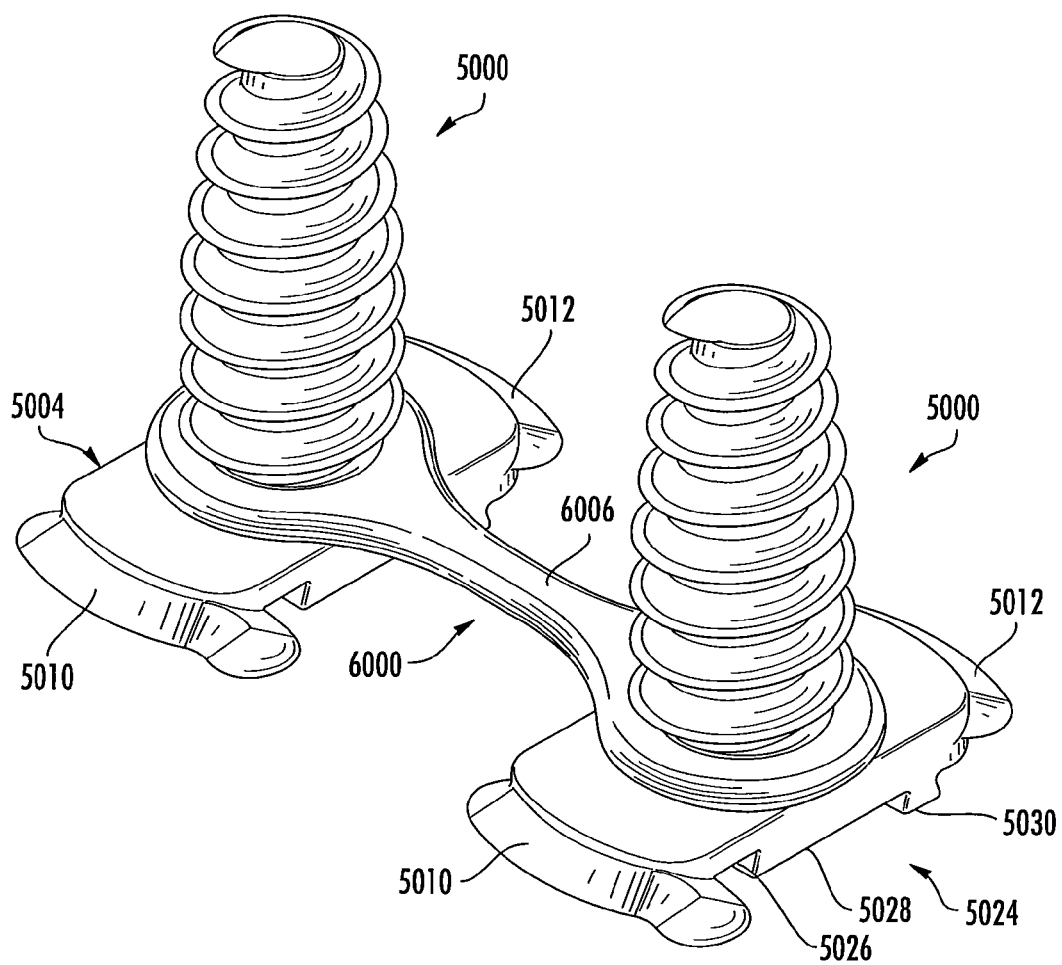
FIG. 28 is a schematic perspective view of an embodiment of the invention.
Figure 30:
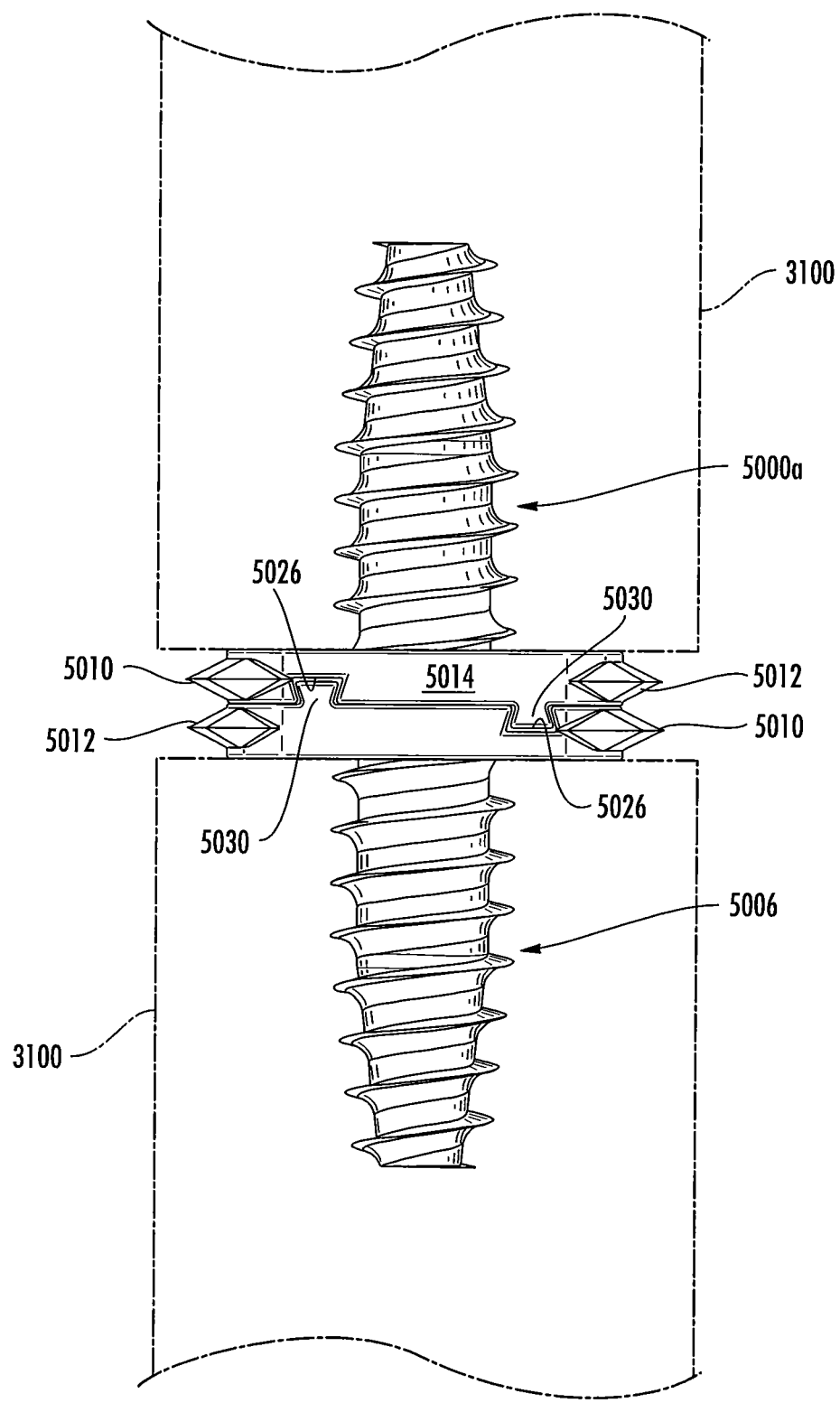
FIG. 30 is a schematic perspective view of an embodiment of the invention.
Figure 31B:
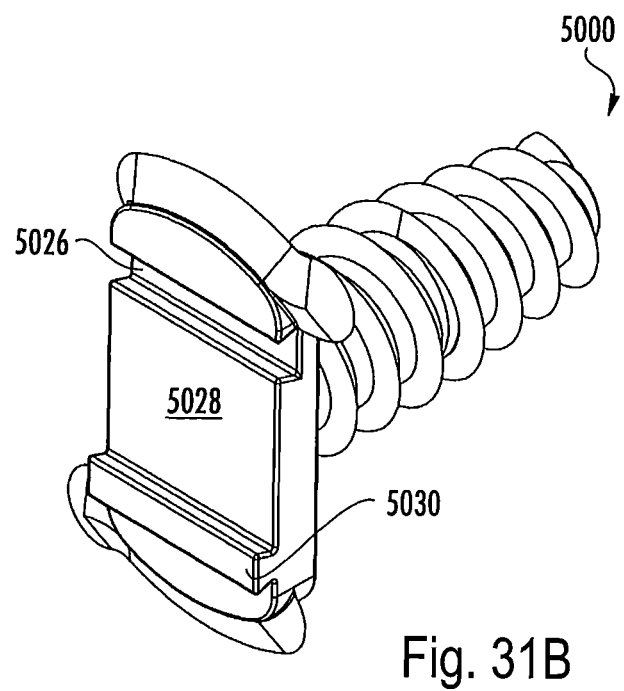
FIG. 31B is a schematic perspective view of an embodiment of the invention.

As discussed above relative to the insert 1100 and the tube engagement portion 1102, the engagement portion 5006 is preferably conical shaped and may be barbed or threaded to provide a friction fit within the void of the central core 58 of an interlocking swim noodle. The base portion 5004 also includes, opposite the engagement portion 5006, a connector cooperating coupling configuration, or mating profile, generally 5024, which could include a variety of different implementations. In one example implementation, as shown in FIGS. 28, 31A and 31B, a first coupling profile is provided in the form of a dovetail-shaped groove 5026 defined in the bottom 5028 of the connector 5000. A second coupling profile is also provided on the bottom of the connector 5000, which may include a dovetail-shaped rib 5030 which corresponds in size to the dovetail-shaped groove 5026. As shown in FIG. 30, the dovetail-shaped groove 5026 and the dovetail-shaped rib 5030 are configured such that two connectors 5000a, 5000b can be joined together in a locking arrangement, with the dovetail-shaped rib 5030 of connector 5000a being received in and engaging dovetail-shaped groove 5026 of connector 5000b, and the dovetail-shaped rib 5030 of connector 5000b being received in and engaging dovetail-shaped groove 5026 of connector 5000a. In this arrangement, the bottom 5028 of each connector 5000a and 5000b is proximate and/or abutting one another; flange 5010 of connector 5000a is adjacent flange 5012 of the connector 5000b, and flange 5012 of the connector 5000a is adjacent the flange 5010 of the connector 5000b.

It is to be understood that numerous other coupling profiles could be used, if desired, other than the example implementation of the dovetail-shaped groove 5026 and the dovetail-shaped rib 5030. For example, groove 5026 could be of a variety of other cross-sectional shapes other than a dovetail, and rib 5030 could be of a corresponding cooperating shape to fit in groove 5026 in a manner to retain the base portions of connectors 5000a and 5000b together. Additionally, although connector 5000 is shown with two coupling profiles 5026, 5030 on each base portion 5004, it is to be understood that each base portion 5004 could include only one coupling profile, i.e., only one groove or rib, or, more than two coupling profiles, if desired.

Connector 5000 is configured such that the engagement portion 5006 may be twisted, or, screwed, into the swim noodle. However, connector 5000 is also configured such that the engagement portion 5006 may, using a generally rectilinear force, be pushed into a side, edge, and/or end surface of swim noodle rather than being twisted, or, screwed, into the swim noodle. Similarly, engagement portion 5006 may be pushed into the central core 58 of a swim noodle, if desired. Because of the shape of the barb, or thread, 5008, once connector 5000 has been pushed into the swim noodle in this manner, it resists to a significant degree being pulled out from the swim noodle. Accordingly, the ability to push connector 5000 into a swim noodle allows for a quick and easy way to securely affix the connector to a swim noodle. If it is desired to later remove or reposition the connector, instead of pulling it out from the swim noodle using a generally rectilinear force (which is possible) it is preferable to use an unscrewing motion in order to cause barb 5008 of engagement portion 5006 to back out of the noodle. In this manner, potential damage caused by the connector 5000 to the noodle during removal can be minimized.

Also, the ability of connector 5000 to be pushed, using a generally rectilinear force, into place in a noodle allows for two connectors 5000a, 5000b to be joined end to end as shown in FIG. 30 by pushing the engagement portion of each connector 5000a, 5000b into the end of a respective noodle 3100. When connector 5000a, 5000b are joined together end to end, the respective direction of the helical twist of the thread 5008 of each may be the same with respect to one another and may eliminate the need for connectors 5000 having threads of different and/or opposite twist directions. For example, if connectors 5000a, 5000b are to be used to join two swim noodles together and/or an accessory to one or more swim noodles, each connector 5000a and 5000b could screwed clockwise into the noodle and/or accessory, and the two coupling profiles 5026, 5030 on each connector base portion then joined together in a mating relationship.

FIGS. 32A, 32B, and 32C illustrate another embodiment of a connector, generally 7000, which includes a body member 7002 having an elongated base portion 7004 and a generally conical shaped threaded engagement portion 7006 connected to and extending generally perpendicularly outwardly from the base portion 7004. In one example implementation, as shown in FIGS. 32A, 32B, and 32C, a first coupling profile is provided in the form of a dovetail-shaped rail 7025 having a dovetail-shaped groove 7026 defined on the bottom 7028 of the connector 7000. A second coupling profile is also provided on the bottom of the connector 7000, which may include a dovetail-shaped rail 7029 having a dovetail-shaped rib 7030, the dovetail-shaped rib 7030 corresponding in size to the dovetail-shaped groove 7026.

Side portions 7034 of base portion 7004 may include channels 7036, 7038 for receipt of dovetail-shaped rails 7025, 7029, respectively, to allow multiple connectors 7000 connected to one another, and may include a connector 7000a be connected perpendicularly with respect to a connector 7000b, if desired. In other words, one or more of the channels 7036, 7038 are adapted to releasably mate with the cooperating coupling configuration 7026, 7030 of a second connector 7000 such that the engagement portions of the two connectors are generally perpendicular with respect to one another.

Additionally, a connector 7000c may be connected in line to connector 7000b, with the dovetail-shaped ribs 7030 being matingly received in the dovetail-shaped grooves 7026. If desired, additional connectors 7000 (not shown) could also be connected to base portions 7004 of connectors 7000a, 7000b, and/or 7000c.

Figure 34A:
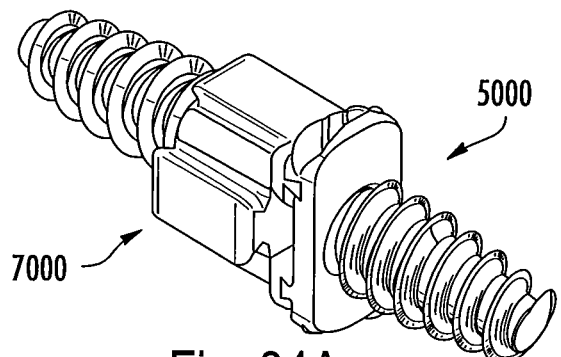
FIG. 34A is a schematic perspective view of an embodiment of the invention.
Figure 34B:
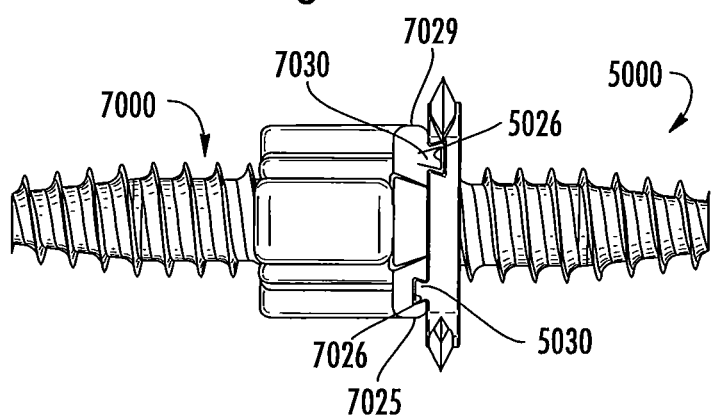
FIG. 34B is a schematic perspective view of an embodiment of the invention.
Figure 34C:
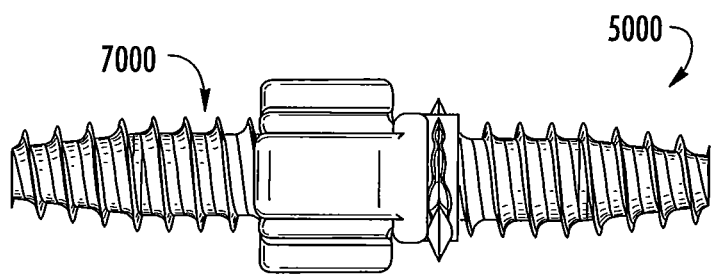
FIG. 34C is a schematic perspective view of an embodiment of the invention.

As shown in FIGS. 34A, 34B, and 34C, connector 7000 can also be connected in an end-to-end relationship to a connector 5000, if desired, with the dovetail-shaped rib 7030 being matingly received in the dovetail-shaped groove 5026, and the with the dovetail-shaped rib 5030 being matingly received in the dovetail-shaped groove 7026.

Figure 33:
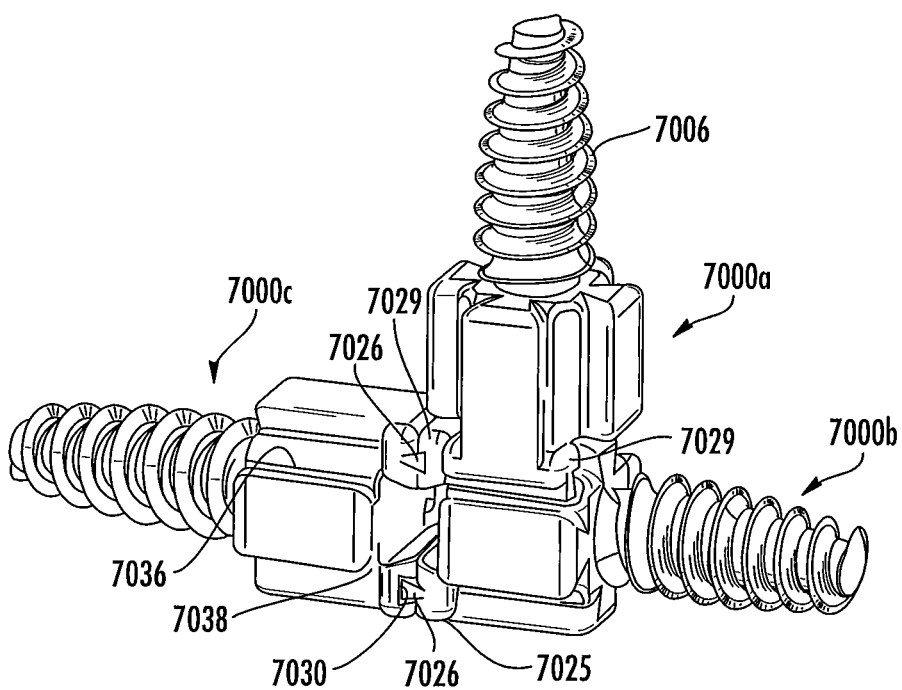
FIG. 33 is a schematic perspective view of an embodiment of the invention.

As shown in FIG. 33, the dovetail-shaped groove 5026 and the dovetail-shaped rib 5030 are configured such that two connectors 5000*a*, 5000*b* can be joined together in a locking arrangement, with the dovetail-shaped rib 5030 of connector 5000*a* being received in and engaging dovetail-shaped groove 5026 of connector 5000*b*, and the dovetail-shaped rib 5030 of connector 5000*b* being received in and engaging dovetail-shaped groove 5026 of connector 5000*a*. In this arrangement, the bottom 5028 of each connector 5000*a* and 5000*b* is proximate and/or abutting one another; flange 5010 of connector 5000*a* is adjacent flange 5012 of the connector 5000*b*, and flange 5012 of the connector 5000*a* is adjacent the flange 5010 of the connector 5000*b*.

Connector 5000 can be used as the insert 1100 and connectors 3000, 3200, 3406, 4006, etc. discussed above to join multiple interlocking and/or conventional non-interlocking smooth-surfaced cylindrical swim noodles. Additionally, such connectors 3000, 3200, 3406, 4006, 5000, 7000 not only allow for multiple noodles to be connected to one another, they can also be used to attach accessories, such as a toy dolphin, horse, seahorse, etc. (none shown) to one or more swim noodles.

Connectors 3000, 3200, 3406, 4006, 5000, 7000, are in one exemplary implementation constructed of plastic of a density that allows them to float on water, such that if they are dropped in a pool, for example, they may remain accessible for use at the water's surface.

Figure 26:
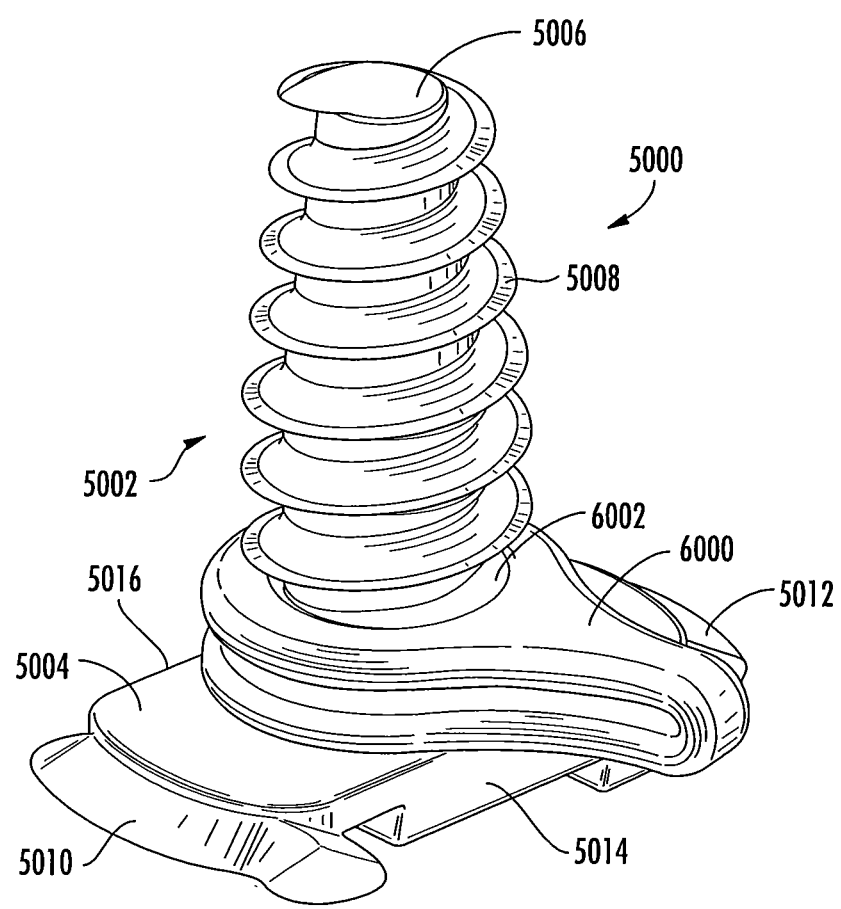
FIG. 26 is a schematic perspective view of an embodiment of the invention.
Figure 27A:
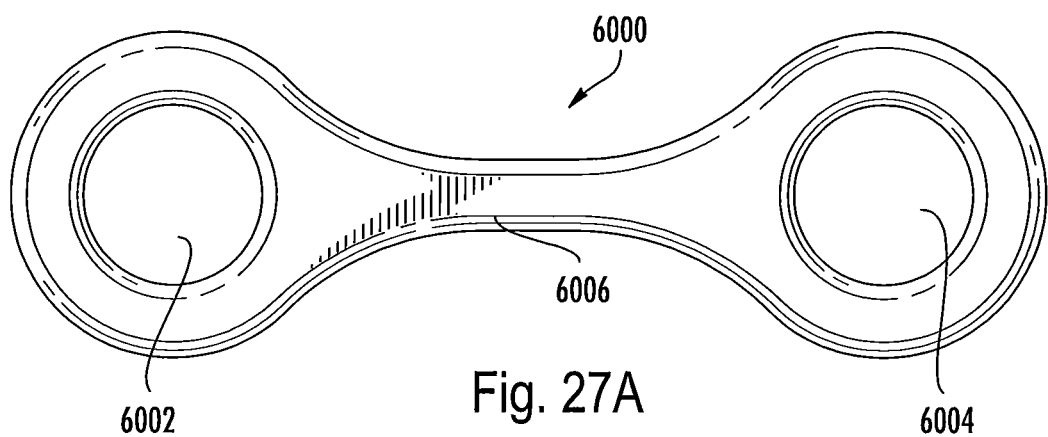
FIG. 27A is a schematic plan view of an embodiment of the invention.
Figure 27B:
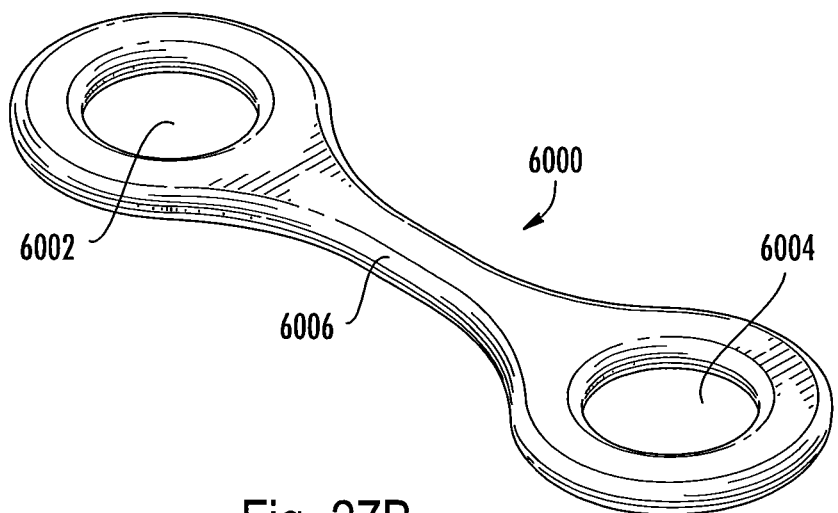
FIG. 27B is a schematic perspective view of an embodiment of the invention.
Figure 29:
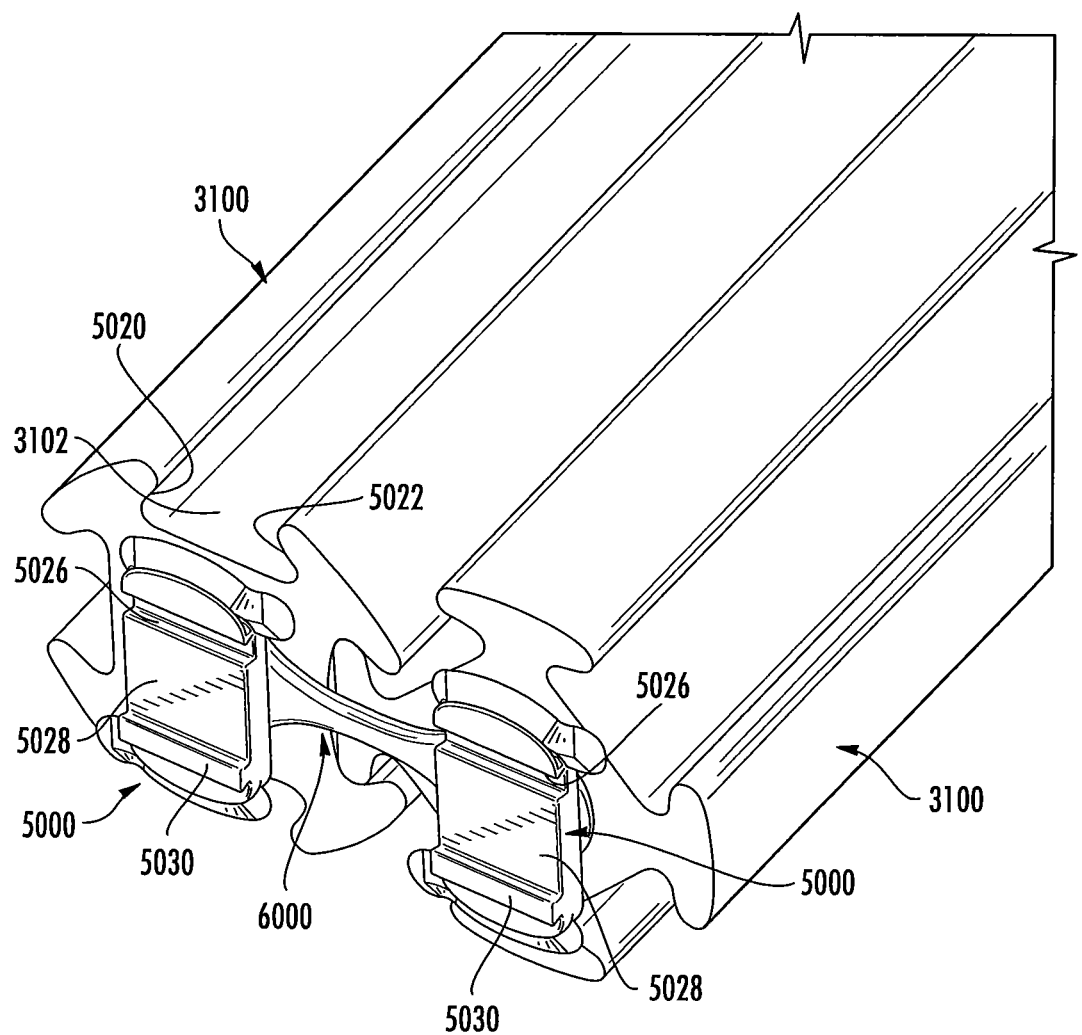
FIG. 29 is a schematic perspective view of an embodiment of the invention.

As shown in FIG. 28, a link member, generally 6000 (FIGS. 27A and 27B), may be used to join one or more connectors 3000, 3200, 3406, 4006, 5000, 7000, etc. together. This, in turn, allows multiple swim noodles to be joined together, as shown in FIG. 29. The link member 6000 has two connector receptacles 6002, 6004 joined together by a bridge portion 6006. Connector receptacles 6002, 6004 are configured to each receive a connector 5000, although it is to be understood that link member 6000 could also be used to join connectors 3000, 3200, 3406, 4006, etc., if desired. Link member 6000 can be rigid or flexible, and as shown in FIG. 26, a flexible link member 6000 can be stored on a connector 5000 (or other connector) if desired, by folding it over upon itself such that both receptacles 6002 and 6004 receive engagement portion 5006.

Although only two swim noodles are shown in FIG. 29 as being joined together, it is to be understood that more than two swim noodles can be joined together by using multiple link members 6000 and/or by using link members having more than two connector receptacles 6002, 6004.

Figure 35:
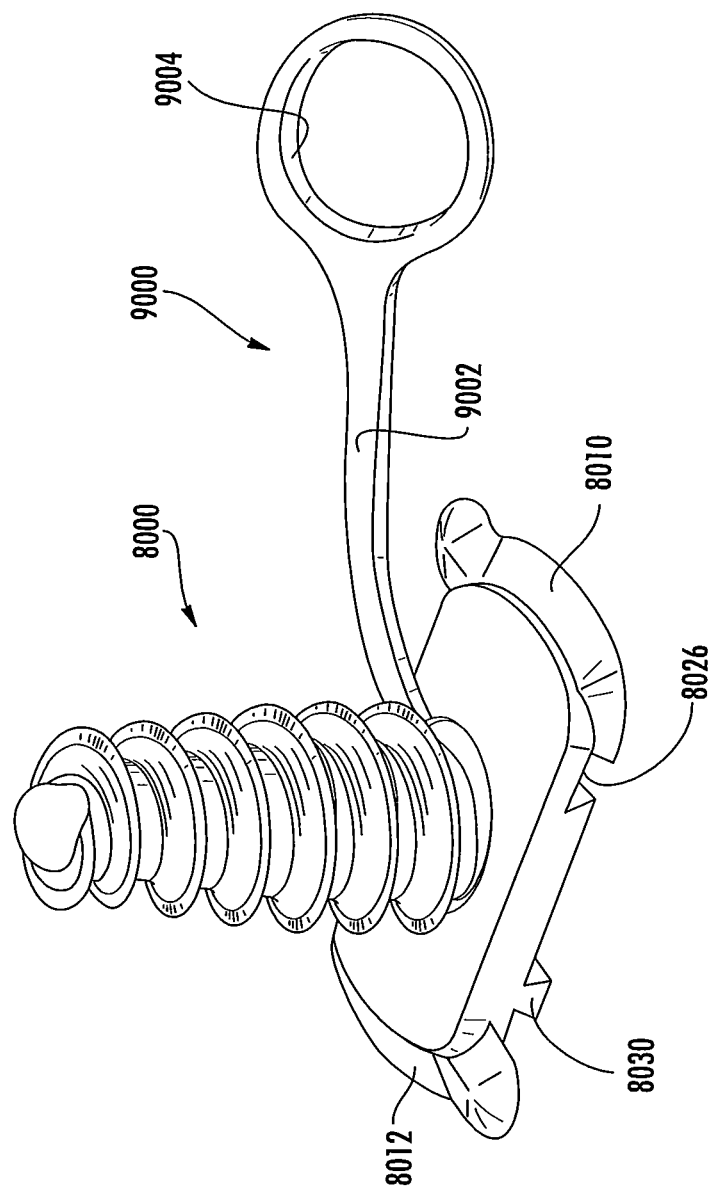
FIG. 35 is a schematic perspective view of an embodiment of the invention.

As shown in FIG. 35, connector 8000 can be provided with a link member, generally 9000. Connector 8000 includes flanges 8010 and 8012 and a dovetail-shaped groove 8026 and rib 8030. Link member 9000 includes an elongated portion 9002 having one end attached to base 8004 of connector 8000. A receptacle 9004 is attached to the distal end of elongated portion 9002. Receptacle 9004 can be used in like manner as are receptacles 6002, 6004 discussed above.

The interlocking swim noodles and cross-braces are preferably a material with a density which is lower than water. The density is preferably at least about 0.9 to 6.0 pounds per cubic foot and more preferably about 1.3 to about 3.0 pounds per cubic foot since this provides a particularly suitable buoyancy for use as a flotation toy. Synthetic resin materials, such as extruded cellular polyethylene, are exemplary for demonstration of the teachings herein as are other materials which are shape retaining and yieldable. Close cell structures are highly preferably over open cell structures as is a material which is bio-compatible with swimming environments.

It is to be understood that the strength of the connection between swim noodles afforded by one or more connectors 3000, 3200, 3406, 4006, 5000, 7000, may be a function of the shape and density of the swim noodles. Generally, the overall buoyancy of one swim noodle, or multiple swim noodles connected together, is a function of displacement or size. One of skill in the art could make adjustments to the connectors 3000, 3200, 3406, 4006, 5000, and or the swim noodles in order to modify buoyancy and/or connection strength as desired.

The invention has been described with reference to the preferred embodiments without limit thereto. One of skill in the art would readily appreciate and realize additional embodiments and improvements which are not specifically stated but which are within the scope of the invention as more specifically set forth in the claims appended hereto. Many modifications and other examples of the disclosure set forth herein may come to mind to those skilled in the art to which this disclosure pertains, having the benefit of the teachings presented in the foregoing descriptions and the associated drawings. Therefore, it is to be understood that the disclosure is not to be limited to the specific examples disclosed and that modifications and other embodiments are intended to be included within the scope of the appended claims.

Moreover, although the foregoing descriptions and the associated drawings describe aspects of the disclosure in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus for connection to at least one swim noodle, the apparatus comprising:
    a first body member and a second body member, each including:
        an elongated base portion;
        a generally conical shaped engagement portion connected to and extending generally perpendicularly outwardly from said base portion;
        said engagement portion defining at least one generally helically barbed portion extending substantially the length of said engagement portion;
        a cooperating coupling configuration provided on said base portion; and
        said cooperating coupling configuration of said first body member being adapted to releasably mate with said cooperating coupling configuration of said second body member to secure said first body member to said second body member;
        said first body member including a side portion generally perpendicular to said elongated base portion of said first body member; and
        said side portion defining at least one channel adapted to releasably mate with said cooperating coupling configuration of said second body member to secure said second body member to said first body member in a manner wherein said engagement portion of said second body member is generally perpendicular to said engagement portion of said first body member.

2. The apparatus of claim 1, further comprising:
said threaded portion of each of at least one of said first body member and said second body member being configured to pierce and penetrate into at least one swim noodle.

3. The apparatus of claim 1, further comprising:
said base portion defining an opening; and
said engagement portion including a hollow portion in communication with said opening.

4. The apparatus of claim 3, further comprising:
a hose adaptor connected in communication with said hollow portion.

5. The apparatus of claim 3, further comprising a link member having two connector receptacles and a bridge portion connecting the two connector receptacles, the connector receptacles being configured to each receive at least one of the first and/or the second body member.

6. An apparatus for connection to a first swim noodle having a central void and a second swim noodle having a longitudinal axis and at least one longitudinally-extending alcove along a periphery thereof defined by side walls, the apparatus comprising:
a body member having an elongated base portion, the base portion defining at least one coupling profile comprising:
an asymmetrically shaped alcove-engaging portion adapted to engage the longitudinally-extending alcove of the second swim noodle, the alcove-engaging portion having a length axis and a width axis, the length axis being longer than the width axis;
a generally conical shaped engagement portion connected to and extending generally perpendicularly outwardly from said base portion; and
a barb extending generally helically about said engagement portion for substantially the length of said engagement portion;
wherein the alcove-engaging portion is adapted to be slidably inserted into the longitudinally-extending alcove when the width axis is parallel to the longitudinal axis of the second swim noodle; and
wherein the alcove-engaging portion engages the side walls of the second swim noodle by interference fit when the length axis is substantially perpendicular to the longitudinal axis of the second swim noodle.

7. The apparatus of claim 6, further comprising:
at least one toe extending outwardly from said alcove-engaging portion configured to engage at least one of the side walls of the second swim noodle when the length axis of the body member is substantially perpendicular to the longitudinal axis of the swim noodle to limit further twisting of the base portion upon said toe being engaged with the side wall.

8. The apparatus of claim 6, further comprising:
said base portion defining an opening; and
said engagement portion including a hollow portion in communication with said opening.

9. The apparatus of claim 8, further comprising:
a hose adaptor connected in communication with said hollow portion.

10. The apparatus of claim 6, further comprising a link member having two connector receptacles and a bridge portion connecting the two connector receptacles, the connector receptacles being configured to each receive at least one of the first and/or the second body member.

11. An apparatus for connection to at least one swim noodle, the apparatus comprising:
a first body member and a second body member, each including:
an elongated base portion;
a generally conical shaped engagement portion connected to and extending generally perpendicularly outwardly from said base portion;
said engagement portion defining at least one generally helically barbed portion extending substantially the length of said engagement portion;
a cooperating coupling configuration provided on said base portion; and said cooperating coupling configuration of said first body member being adapted to releasably mate with said cooperating coupling configuration of said second body member to secure said first body member to said second body member;
said first body member including an end portion opposite said generally conical shaped engagement portion of said first body member; and
said end portion defining at least one channel adapted to releasably mate with said cooperating coupling configuration of said second body member to secure said second body member to said first body member in a manner wherein a longitudinal axis of said engagement portion of said second body member is generally collinear with a longitudinal axis of said first body member.

12. The apparatus of claim 11, further comprising:
at least one link member defining a plurality of receptacles; and
each said receptacle being configured to receive said engagement portion of said first body member or said second body member.

13. The apparatus of claim 11, further comprising:
said base portion of at least one of said first body member and said second body member defining an opening; and
said engagement portion of at least one of said first body member and said second body member including a hollow portion in communication with said opening.

14. The apparatus of claim 13, further comprising:
a hose adaptor connected in communication with said hollow portion.

15. The apparatus of claim 11, further comprising a link member having two connector receptacles and a bridge portion connecting the two connector receptacles, the connector receptacles being configured to each receive at least one of the first and/or the second body member.

16. An apparatus for connection to at least one swim noodle, the apparatus comprising:
a first body member and a second body member, each including:
an elongated base portion;
a generally conical shaped engagement portion connected to and extending generally perpendicularly outwardly from said base portion;
said engagement portion defining at least one generally helically barbed portion extending substantially the length of said engagement portion;
a cooperating coupling configuration provided on said base portion; and
said cooperating coupling configuration of said first body member being adapted to releasably mate with said cooperating coupling configuration of said second body member to secure said first body member to said second body member;

said first body member including a side portion generally perpendicular to said elongated base portion of said first body member; and said side portion defining at least one channel adapted to releasably mate with said cooperating coupling configuration of said second body member to secure said second body member to said first body member in a manner wherein said engagement portion of said second body member is generally parallel with said engagement portion of said first body member.

17. The apparatus of claim 16, further comprising:

said base portion of at least one of said first body member and said second body member defining an opening; and said engagement portion of at least one of said first body member and said second body member including a hollow portion in communication with said opening.

18. The apparatus of claim 17, further comprising:

a hose adaptor connected in communication with said hollow portion.

19. The apparatus of claim 16, further comprising a link member having two connector receptacles and a bridge portion connecting the two connector receptacles, the connector receptacles being configured to each receive at least one of the first and/or the second body member.

* * * * *